(12) United States Patent
Hirayama

(10) Patent No.: US 6,889,352 B2
(45) Date of Patent: May 3, 2005

(54) DIGITAL SIGNAL FORMING METHOD, DISC RECORDING MEDIA USING THE SAME, AND REPRODUCING METHOD THEREOF

(75) Inventor: Hiroshi Hirayama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 635 days.

(21) Appl. No.: 09/796,772

(22) Filed: Feb. 28, 2001

(65) Prior Publication Data

US 2002/0053051 A1 May 2, 2002

(30) Foreign Application Priority Data

Nov. 1, 2000 (JP) ........................................ 2000-334822

(51) Int. Cl.$^7$ ............................................. H03M 13/00
(52) U.S. Cl. ...................... 714/774; 714/788; 714/769
(58) Field of Search ............... 369/59.25; 714/752–753, 714/755–756, 761–762, 774, 702, 769, 770, 785, 787, 788; 386/46; 360/48, 55

(56) References Cited

U.S. PATENT DOCUMENTS 5,581,361 A * 12/1996 You et al. ...................... 386/46
6,260,169 B1 * 7/2001 Massoudi .................... 714/769
6,751,771 B2 * 6/2004 Chuang et al. ............. 714/784

* cited by examiner

Primary Examiner—Guy J. Lamarre
(74) Attorney, Agent, or Firm—Townsend and Townsend and Crew LLP

(57) ABSTRACT

A digital signal forming method and apparatus therefore for improved error correction capability without requiring a change to the number of error correcting codes includes forming a plurality of data sectors from an information stream, forming sector data blocks by dividing up each data sector, adding error correction codes to the sector data blocks, and combining the sector data blocks to produce interleaved allocations (also known as recording sectors).

12 Claims, 4 Drawing Sheets

FIG. 1A
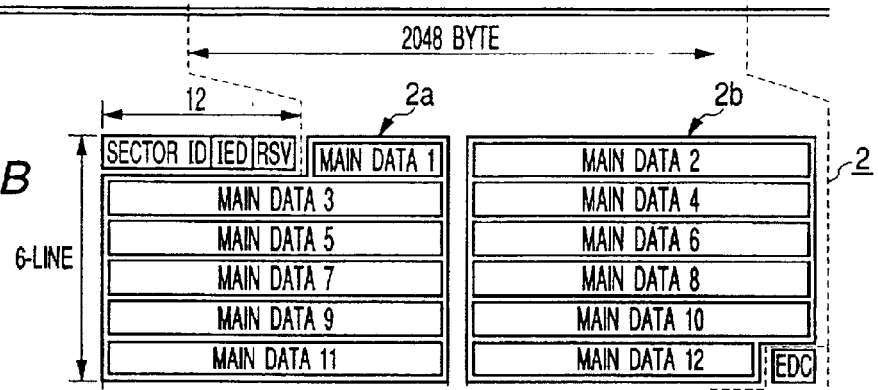
FIG. 1B
FIG. 1C
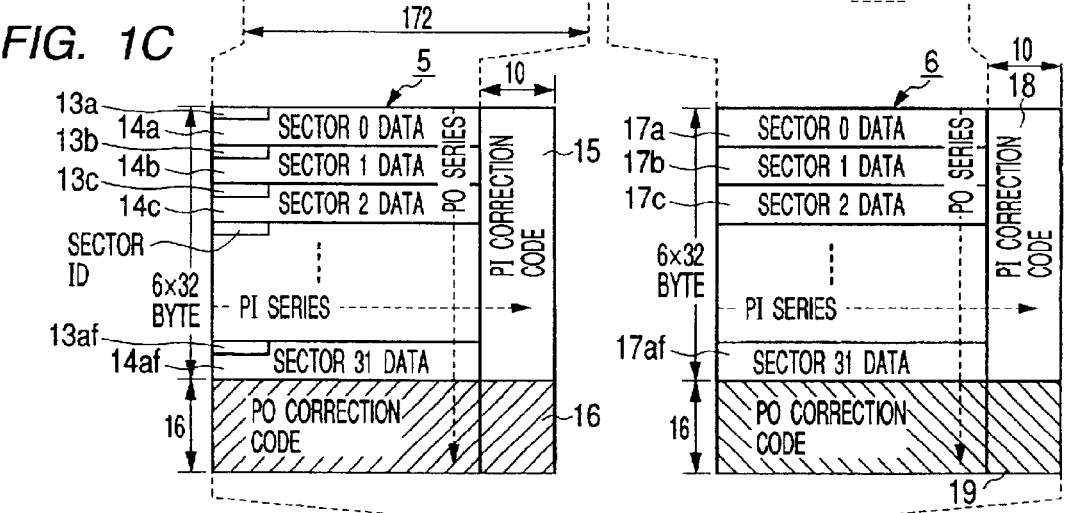
FIG. 1D
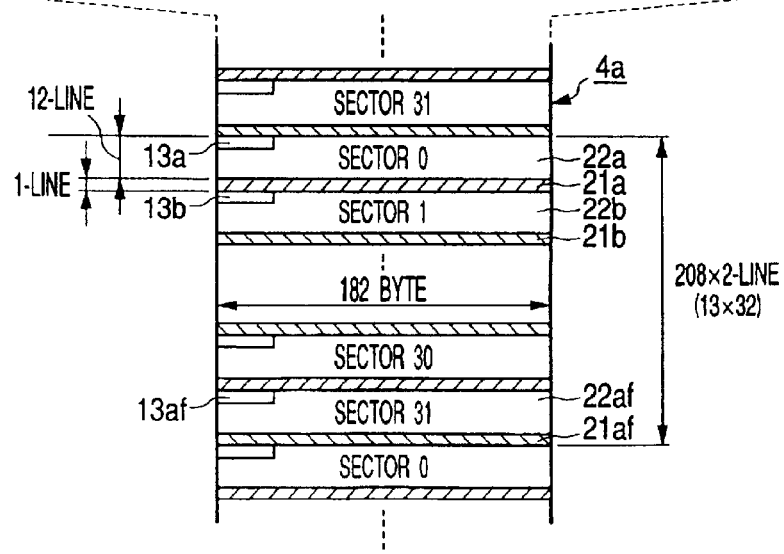

FIG. 2A
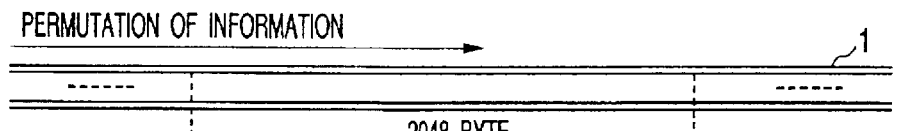
FIG. 2B
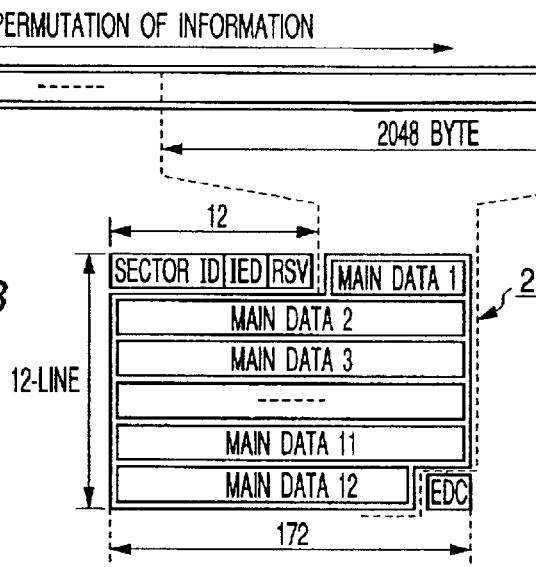
FIG. 2C
FIG. 2D
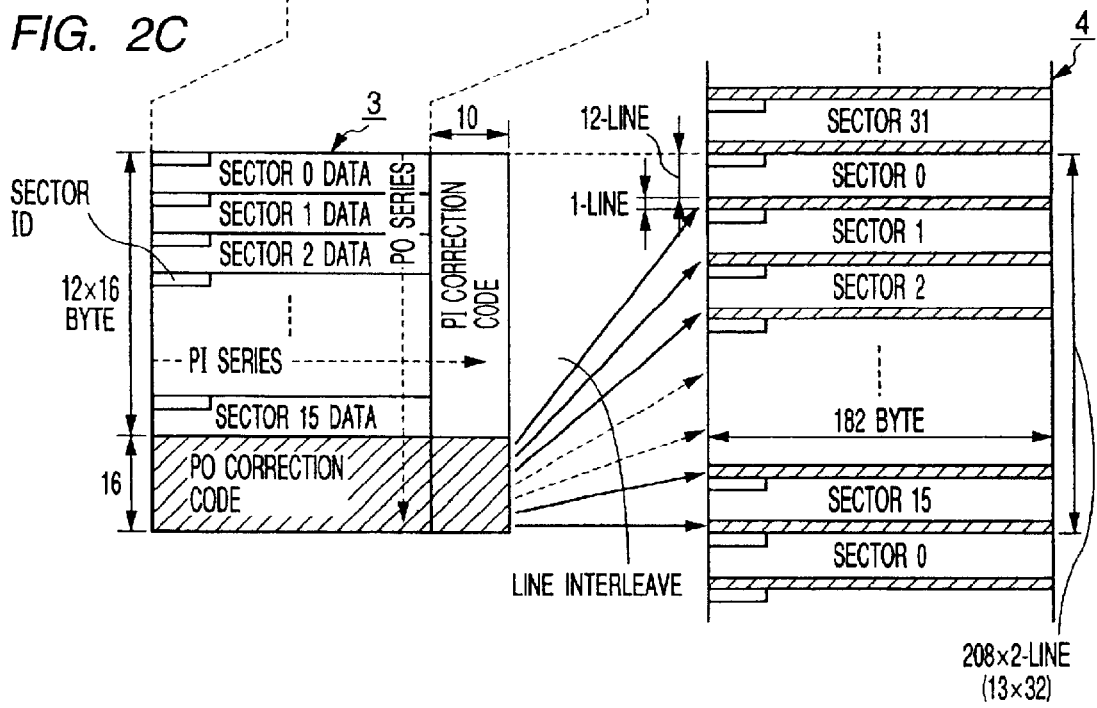

DIGITAL SIGNAL FORMING METHOD, DISC RECORDING MEDIA USING THE SAME, AND REPRODUCING METHOD THEREOF

BACKGROUND OF THE INVENTION

The present invention relates to a digital signal forming method, disc recording media using the same and reproducing method thereof and particularly to a digital signal forming method suitable for information recording media, disc recording media having recorded the digital signal formed with this method as the recording pits (marks) and the reproducing method thereof.

As an example of disc recording media for converting a recording information to a digital signal suitable for recording media and then recording such digital signal as the recording pits (marks) on the media, a DVD (Digital Versatile Disc) may be listed. A method of forming such digital signal is described in the article "Data Compression and Digital Modulation", NIKKEI ELECTRONICS BOOKS, 1998, pp. 119 to 123. In this reference, 2064 bytes where an addition information pieces such as sector ID number are added to the recording information amount in unit of 2048 bytes (number of bytes up to main data 12 from the main data 1) after scramble process are defined as one sector data, these sector data are in the form of 172 bytes×12 lines. In the allocation in unit of 172 bytes×12 lines×16 sectors for 16 sector data, the PO correction code of 16 bytes are added in the vertical direction as the external code, and the PI correction code of 10 bytes are also added in the lateral direction including the PO correction code as the internal code, and the correction block of (172+10) bytes×(12 lines× 16 sectors+16 lines) is formed. Moreover, the interleave allocation is formed by interleaving in unit of one line the line data of the correction block. After modulation and framing process (to add a synchronization signal) from the heading line of the interleave allocation, generated digital signal is recorded as the recording pits (marks) along the tracks on the disc. At the time of reproducing, the original recording information can be reproduced by reproducing the recording pits (marks) using an optical head, then conducting detection of the frame synchronizing signal, demodulation process, recovery of the interleave allocation and then conducting the correction process for the error generated in the correction block with the PI, PO correction code. The PI correction code is used for correction of the random error included in unit of line from, while the PO correction code is used for correction of the burst error included in a plurality of line data.

The correction code, allocation format, modulation system, framing process are used in common for the recording signals to the DVD disc such as read-only disc (DVD-ROM), WORM(Write Once Recording Media) disc (DVD-R), re-writable disc (DVD-RW, DVD-RAM or the like) and the compatibility of digital signal process for recording and reproducing is assured.

A digital signal forming method of the related art will be explained with reference to FIG. 2.

FIGS. 2 illustrate allocation of data and codes for explaining the digital signal forming method on the occasion of recording information to a disc of the related art. FIG. 2(A) illustrates a recording information on a recording medium, while FIG. 2(B) illustrates a sector data, FIG. 2(C) illustrates a correction block and FIG. 2(D) illustrates an interleave allocation.

In these figures, the reference numeral 1 indicates a series of recording information (divided in unit of 2048 bytes) to be recorded to a recording medium; 2, a format of the sector data which is one of the recording unit to the recording medium The sector data 2 divides a series of recording information 1 in unit of 2048 bytes. The sector data 2 is formed of an additional information of 12 bytes for RSV (reservation) including the sector ID (Identification Data) indicating the physical recording position on the disc, IED (ID Error Detection Code) for correction of one byte to the sector ID and a copy inhibit flag information or the like and the EDC (Error Detecting Code) checking existence of error to the main data 1 to 12 of 2048 bytes recording information. Moreover, the allocation in total of 172 bytes×12 lines×16 sectors is formed by collecting 16 sector data 2. In this allocation of 172 bytes×12 lines×16 sectors, the correction block 3 is formed with addition of the error correction code to each series of vertical and lateral series in order to cover the burst error and random error resulting from scratch or dust on the disc during the reproducing of disc. Namely, the correction block 3 of 182 bytes×208 lines is formed by generating and adding the PI (outer-code parity) correction code of 16 bytes to the codes 12×16 bytes in the vertical direction and then the PI (inner-code parity) correction code of 10 bytes to the code of 172 bytes in the lateral direction. Moreover, in the correction block 3, the interleave allocation 4 can be obtained by conducting the interleave process in every line from the heading line in the allocation of the PO correction code in unit of allocation of the data of sector 15 from the data of sector 0 by 182 bytes×12 lines. In the interleave allocation 4, the PO correction code of one byte is allocated sequentially between sectors and the sector ID is allocated at the heading position of each sector. Each line of the sectors 0 to 15 is provided with a line of the data and PI correction code.

The ID number included in each sector after the interleave is given a series of continuous number and also continuous even at the adjacent sectors. Finally, the modulation process and framing process are performed to generate the adequate digital signal for recording as the recording pits (marks) on the disc.

In the case of reproducing of the recording information from a disc, the recording pits (marks) are read with an optical head and are then converted to a digital signal. Thereafter, after the frame synchronizing process and demodulating process are conducted in the inverse sequence of generation of the digital signal explained with reference to FIG. 2, the interleave allocation is recovered, for example, on a semiconductor memory and the error data included in the allocation is corrected by conducting the correction process through decoding of the PI, PO correction codes while releasing the interleave allocation. From the data series as the encoding object of the PI, PO correction codes in the correction block 3, the PI correction code corresponds to the random error correction which is occurred at random in the line data including the continuous recording information, while the PO correction code corresponds to the burst error correction which is occurred in the form of a burst for a plurality of lines of vertical series. Allocation, code length in the PI and PO series, number of additional bytes of the PI, PO correction codes, number of bytes (symbols) to be corrected, namely the correction capability is determined to realize sufficient correction capability for the error rate, scratch and dust during the disc reproducing.

A disc recording medium represented by the DVD is assumed in future to show more improvement of recording density of a recording medium and higher transfer rate for the purpose of longer-term recording and reproduction of video information and recording of higher definition video information in the higher transmission rate. As an example of the method to realize improvement in recording density and transfer rate, it is possible to form a track pitch to 1/m (m is a decimal number larger than 1) and a recording pit (mark) to 1/n (n is a decimal number larger than 1) on the disc of the related art or introduce the modulation system having higher encoding efficiency for generation of the digital signal. However, with improvement in the recording density, generation of burst error resulting from scratch or dust generated on the disc during the reproducing increases, and thereby readability of disc is lowered. Therefore, on the high density recording, it is essential to assure sufficient readability resistive to actual operation for scratch and dust, namely to improve the error correction capability for the digital signal to be recorded.

However, when only the number of correction codes is increased, the number of symbols that can be corrected is increased and the number of codes as the correction object and the number of correction codes to be generated are increased for improvement of error correcting capability, here rises problems that the correction code to realize error correction capability cannot be generated and redundant data having no relation to the recording information increases. Moreover, there rises also a problem that compatibility of signal process between the generation and reproduction processes of the recording signal for the current DVD is remarkably lowered.

SUMMARY OF THE INVENTION

Therefore, it is an object of the present invention to provide a digital signal forming method, disc recording media using the same and recording method thereof for solving the problems explained above, assuring the error correction capability required for high density recording and maintaining high level compatibility for generation and reproduction processes of the recording signal.

In order to achieve the object explained above, in the digital signal recording method, the data of every constant information amount unit is interleaved in a plurality of correction block allocations for completing the error correction process for a series of recording information. In each correction block allocation, the PO correction code for the vertical direction series and PI correction code for the lateral direction series are generated and added to form the correction block in order to correct an error generated in the reproducing. After forming the correction block, the data line including the PI correction code is alternately allocated from the beginning of the correction block and the line including the PO correction code is allocated in the equal interval for every constant line data. Thereby, the interleave allocation can be formed. Moreover, the digital signal is generated by executing at least modulation process from the heading line of the interleave allocation and it is then recorded on the disc as the recording marks (pits). At the time of recording the digital signal, the digital signal generated with the modulation process where less amount of redundant data is generated with the highly efficient encoding and with reduction of recording mark (pit) size.

Moreover, at the time of reproducing the digital signal recorded on a disc in the higher recording density, the demodulation process is executed to the reproducing signal obtained, this signal is then temporarily stored to recover the interleave allocation and the error correction process due to the decoding of the PI, PO correction codes is performed respectively for a plurality of correction blocks. Moreover, the recording information interleaved in the correction block can be reproduced by outputting such information to maintain the permutation of recording information.

BRIEF DESCRIPTION OF THE DRAWINGS

FIGS. 1(A) to 1(D) illustrate the allocation of data and code for explaining a first embodiment of the digital signal forming method of the present invention.

FIGS. 2(A) to 2(D) illustrate the allocation of data and code for explaining the digital signal forming method at the time of recording the information to the disc of the related art.

DESCRIPTION OF THE REFERRED EMBODIMENTS

Figure 3A:
FIGS. 3(A) to 3(D) illustrate the allocation of data and code for explaining a second embodiment of the digital signal forming method of the present invention.

The preferred embodiments of the present invention will be explained with reference to the accompanying drawings.

FIG. 1(A) illustrates recording information on a recording disc. FIG. 1(B) illustrates a sector. FIG. 1(C) illustrates a correction block and FIG. 1(D) illustrates an interleave allocation. This embodiment illustrates an example of the digital signal forming method that is suitable for high density recording to a disc and assures compatibility for the current DVD recording signal.

In these figures, the reference numeral 1 designates a series of recording information to be recorded to a recording medium; 2, a format of the sector data which is one of recording unit to the recording medium, including a part of the recording information 1; 5, 6, formats of the first and second correction block that are the unit for completing the PO correction code as the external code and the PI correction code as the internal code including a plurality of sector data 2; 4a, an interleave format respectively for the sector data 2; included in the first and second correction blocks 5, 6 and the line data including the PO correction code.

Details of the digital signal forming method in the first embodiment will be explained below.

The structural elements of the sector data 2 in FIG. 1 are identical to that of the sector data of FIG. 2. This embodiment discloses a method that in the case where highly efficient modulation process or high density recording is conducted by reducing the recording pit (mark) in order to generate the digital signal to be recorded, while the digital signal having the higher error correction capability is generated, compatibility for the digital signal forming method of FIG. 2 must be maintained in the higher level. Therefore, while the kind of correction code, number of additional bytes and format of the correction block are maintained, the burst error must be interleaved effectively in such a manner as not exceeding the correction capability for the correction block during the reproducing.

Therefore, in this embodiment, the sector data 2 is divided into two blocks as the first sector data block 2a and the second sector data block 2b. In the first sector block 2a, the sector ID, IED code, RSV code and main data 1, 3, . . . , 11 of the odd number are allocated, in the second sector block 2b, the main data 2, 4, . . . , 12 of the even number and EDC are allocated. At the forming the correction block, the sector ID and additional information, and the main data 1, 3, ..., 11 of the odd number are allocated in the first correction block 5, while the main data 2, 4, ..., 12 of the even number and EDC are allocated in the second correction block 6. The required number of sectors is identical to the 32 sector data up to the sector 31 from the sector 0 in order to perform the interleave to the two correction blocks in unit of 172 bytes. Therefore, each sector data of the sector 0 to sector 31 is divided into the two sector data blocks that are respectively allocated in the first and the second correction block 5, 6.

After the main data of sector 0 to sector 31 are interleaved to the first and second correction block 5, 6, the PI, PO correction codes are encoded independently as in the case of FIG. 2 to form the correction block of the 182 bytes×208 lines of the same data amount. In the first correction block 5, 13a, 13b, ..., 13z, 13aa, ..., 13af indicate the sector ID of the sector 0 to section 31, while 14a, 14b, ..., 14z, 14aa, ..., 14af indicate the data of sector 0 to sector 31, 15, the PI correction code, 16, the PO correction code. In addition, in the second correction block 6, 17a, 17b, ..., 17z, 17aa, ..., 17af indicate the data of sector 0 to sector 31, 18, the PI correction code and 19, PO correction code.

Moreover, the interleave allocation 4a is a result of the interleave process for the line data included of the first and second correction blocks 5, 6 conducted to avoid the burst error to the PO correction code. In the interleave allocation 4a, each line of the PO correction coeds 16, 19 of the first and second correction blocks 5, 6 is alternately allocated in such a manner that 21a, 21b, ..., 21z, 21aa, ..., 21af are allocated in the first line of the PO correction code 16 of the first correction block 5, first line of the PO correction code 19 of the second correction block, second line of the PO correction code 16 of the first correction block 5, second line of the PO correction code 19 of the second correction block 6, .... On the other hand, 22a, 22b, ..., 22z, 22aa, ..., 22af are identical to a lines of the data of sector 0 to sector 31 and PI correction codes 15, 16.

In the interleave allocation 4a, sector data in unit of 182 bytes including the PI correction codes 15, 19 is allocated in the sequence of the line data for the main data 1 to 12 and the sector data is allocated to result in the continuous line data including the main data 1 to 12. Namely, reallocation is performed maintaining continuity of the recording information 1. Moreover, the line data including the PO correction codes 16, 19 included in the first and second correction blocks 5, 6 are alternately interleaved between the sector data.

In the case of FIGS. 1(A) to 1(D), the heading line of the line data including the PO correction code 16 is allocated, for example, between the data 22a and 22b, while the heading line of the line data including the PO correction code 19 is allocated between the data 22b and 22c. Hereinafter, the line data including the PO correction codes 16, 19 are alternately interleaved. After interleaving, the higher efficiency modulation process and framing process due to addition of the synchronizing signal are performed, and high density recording by the short wavelength laser is conducted along the tracks on the disc and thereby the data is recorded as the recording marks or pits.

In the first embodiment explained above, the data amount same as the correction block and correction code of FIG. 2 can be used by interleaving alternately the sector data for the first and second correction blocks 5, 6, also interleaving it to the line data in the 32 sector data and respectively generating and adding the PO correction codes 16, 19 and PI correction data 15, 18. Moreover, on the occasion of alternately interleaving the line data including the correction block 5, 6 the line data forming each sector data is re-allocated to maintain the continuity of the recording information 1. Thereby, the compatibility for the reproducing digital signal can be kept in the higher level. In the case where a burst error in which data continuously becomes error in the interleave allocation is generated, the burst error can be interleaved effectively to the first and second correction blocks 5, 6. Accordingly, generation of the digital signal having improved burst error correction capability can be realized without increase of the redundant data.

Improvement effect of correction capability due to the interleaving of burst error in the first embodiment will be explained. For example, the digital signal generated depending on the first embodiment is recorded on the disc in the doubled recording density of that in the related art with reduction in length of the recording marks (pits) and highly efficient modulation. In this case, if a scratch or dust occurs on the disc to generate the burst error, for example, of 16 lines in the disc of related art having the equal recording density, the burst error occurs in the 32 lines. However, since the burst error of 32 lines is interleaved in every 16-line for the allocation of the first and second correction block 5, 6, if the limit of the PO correction capability is set to 16 lines, reproducing is possible because the number of burst error line included each correction block 5, 6 is within such limit. Namely, while the allocation of the correction code and correction block of FIG. 2 is used in direct, the correction capability for the burst error can be doubled in the improvement degree.

The digital signal forming method in the first embodiment can be described as follow as the processing steps.

The digital signal forming method comprises a step to form, in every constant recording information amount, a plurality of sector data in which an address information indicating the position on the recording medium is added to the main data, a step to share the address information of each sector data and main data of the odd number to the first sector data block and share the main data of the even number of each sector data to the second sector data block, and a step to form the first and the second correction block by adding the first correction code and the second correction code to correct the error in the line direction to each of the first sector data block and second sector data block, and adding the third correction code and fourth correction code to correct the error in the vertical direction to plurality of the first and second sector data block.

Moreover, the digital signal forming method of the first embodiment also comprises a step to sequentially allocate a plurality of sector data giving continuity to the main data by alternately allocating the line data forming the first, second correction block and a step to sequentially allocate the line of the third, fourth correction code between the sector data sequentially allocated. Namely, the correction codes added in the line and vertical directions in the respective first and second correction blocks are not limited only to the codes of the same kind and the number of codes.

On a recording medium, the digital signal that is generated by at least the modulation process to the digital signal generated with the process including the steps explained above is recorded.

With reference to FIG. 3, the second embodiment of the digital signal forming method of the present invention will be explained.

Figure 3B:
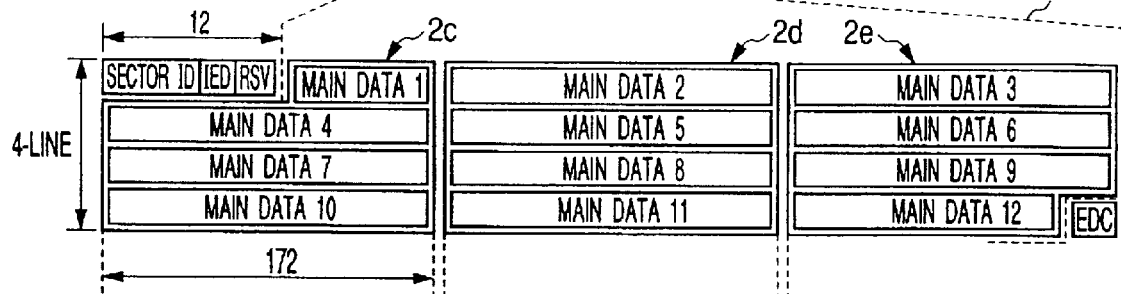
Figure 3C:
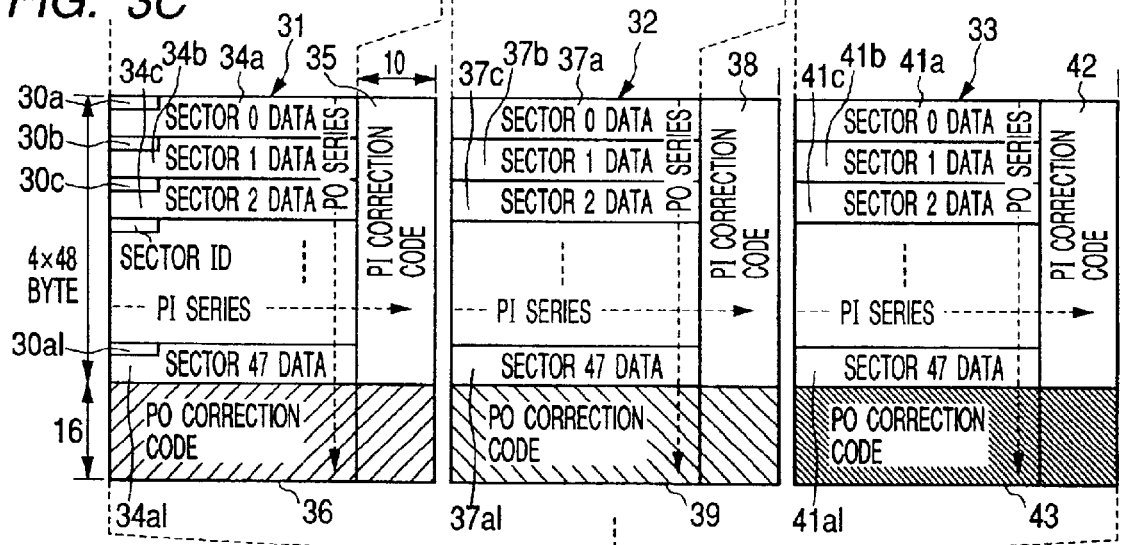
Figure 3D:
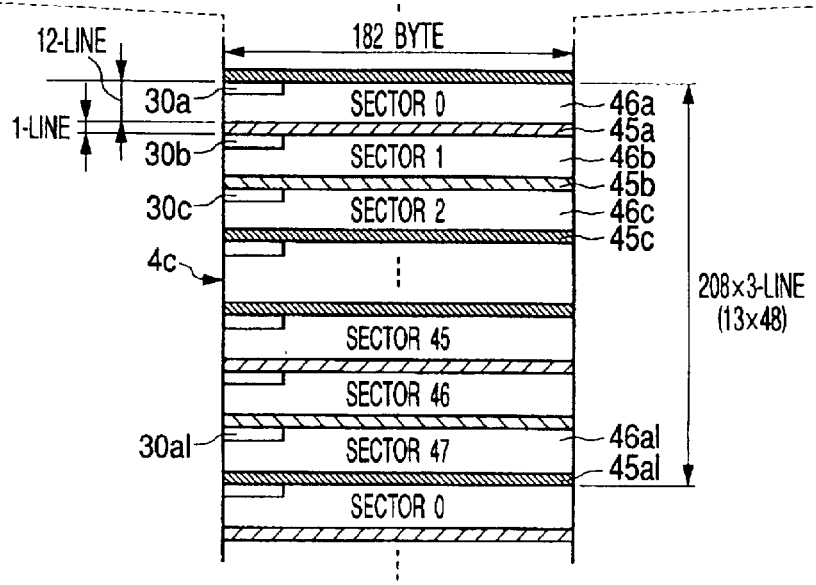

FIG. 3(A) illustrates a recording information on a recording medium; FIG. 3(B), a sector data; FIG. 3(C), a correction block and FIG. 3(D), an interleave allocation.

In FIG. 3, the sector data 2 is divided to the first sector data block 2c, second sector data block 2d and third sector data block 2e. The first data block 2c includes sector ID, IED, RSV and main data 1, 4, 7, 10, while the second sector data block 2d includes main data 2, 5, 8, 11 and the third sector data block 2e includes the main data 3, 6, 9, 12 and EDC. Each sector data of the sector 0 to sector 47 is divided, as illustrated in FIG. 3(B), to the first, second and third sector data blocks 2c, 2d, 2e, the first correction block 31 illustrated in FIG. 3(C) is formed of the first sector data block 2c of the sector 0 to sector 47, the second correction block 32 illustrated in FIG. 3(C) is formed of the second sector data block 2d of the sector 0 to sector 47 and the third correction block illustrated in FIG. 3(C) is formed of the third sector data block 2e of the sector 0 to sector 47.

In the first correction block 31 illustrated in FIG. 3(C), 30a, 30b, 30c, . . . , 30z, 30aa, . . . , 30al designate the sector ID of the sector 0 to sector 47; while 34a, 34b, 34c, . . . , 34z, 34aa, . . . , 34al, the main data of the sector 0 to sector 47; 35, the PI correction code and 36, the PO correction code. In the second correction block 32 illustrated in FIG. 3(C), 37a, 37b, 37c, . . . , 37z, 37aa, . . . , 37al designate the main data of the sector 0 to sector 47; 38, the PI correction code; 39, the PO correction code. In the third correction block 33 illustrated in FIG. 3(C), 41a, 41b, 41c, . . . , 41z, 41aa, . . . , 41al designate the main data of the sector 0 to sector 47; 42, the PI correction code; 43, the PO correction code. As the data of the sector 0 to sector 47 of the first to third correction blocks 31 to 33, the data of the first to third sector data blocks 2c to 2e are allocated.

As explained above, in the sector data including the elements similar to that of FIG. 1 and also including the continuous recording information 1, the line data in unit of 172 bytes that is the additional unit of the PI correction code is allocated for interleaving to the first, second, and third correction block 31, 32, 33. In order to interleave the sector data to the first, second and third correction blocks 31 to 33, the 48 sector data (16 sector×3) are required. Three correction blocks, each block is formed of 182 bytes×(4 lines×48 sectors+16 lines), namely 182 bytes×208 lines, are formed by interleaving the line data included in the 48 sector data and respectively adding the PO correction codes 36, 39 and 43, and the PI correction codes 35, 38 and 42. In regard to the interleave method of the line data including the PO correction codes 36, 39, 43 after generation of the first, second and third correction blocks 31, 32, 33, the sector data in unit of 182 bytes including the PI correction code like FIG. 1 are allocated in the sequence of line data for the main data 1 to 12 and the main data 1 to 12 are allocated continuously in the sector data. Namely, the recording information 1 is allocated keeping the continuation thereof.

In addition, the line data including the PO correction codes 36, 39, 43 are alternately interleaved. In the case of FIG. 3, the heading line of the line data including the PO correction code 36 is allocated, for example, between the data of sector 0 and the data of sector 1, while that including the PO correction code 39 is allocated between the data of sector 1 and the data of sector 2 and that including the PO correction code 43 is allocated between the data of sector 2 and the data of sector 3, respectively. Hereinafter, the line data including the PO correction codes 36, 39, 43 of the first, second and third correction blocks 31 to 33 are sequentially and alternately interleaved.

As explained above, the interleave allocation 4c can be obtained. In FIG. 3(D), 45a, 45b, 45c, . . . , 45z, 45aa, . . . , 45al respectively designate the first line of the PO correction code 36, first line of the PO correction code 39, first line of the PO correction code 43, second line of the PO correction code 36, second line of the PO correction code 39, second line of the PO correction code 43, . . . ; while 46a, 46b, 46c, . . . , 46z, 46aa, . . . , 46al respectively designate the sector data 0 to 47 include the PI correction codes 35, 38, 42.

In the second embodiment, the data amount identical to the correction blocks of FIG. 2 and the correction codes can be used in direct and the high level compatibility can be maintained for processing the reproduced digital signal by alternately interleaving the continuous recording information 1 and sector data including sector ID to the first, second and third correction blocks 31 to 33, then also interleaving to the 48 sector data that is three times of the 16 sector data and by re-allocating, at the time of alternately interleaving the line data including the PO correction codes 36, 39, 43, the line data forming each sector data included in the first, second and third correction blocks 31 to 33 in order to maintain the continuity of the recording information 1. When a burst error is occurred wherein data error generated continuously in the interleave allocation 4c, since the burst error can be efficiently interleaved to the first, second and third correction blocks 31 to 33, the digital signal can be generated for improvement of the burst error correction capability without any increase of the redundant data.

Effect of improvement in the correction capability due to the interleaving of the burst error in the second embodiment will then be explained. For example, the digital signal generated depending on the second embodiment is recorded to a disc in the recording density of three times. In this case, if a scratch or dust which generates the burst error of 16 lines is generated in the disc of a certain recording density in the related art, the burst error of 48 lines (three times of 16 lines) is generated. However, since the burst error of 48 lines is interleaved in every 16-line in the allocation of the first, second and third correction block 31, 32, 33, if the limit of the PO correction capability is 16 lines, reproduction becomes possible because the number of burst error line included each correction block 31 to 33 is within such limit. Namely, while the correction code and correction block allocation in FIG. 2 are used, the correction capability for the burst error can be improved up to three times.

Therefore, in the case where 16×n sectors are required when the line data in unit of 172 bytes in the sector is interleaved and allocated in the correction blocks from the $1^{st}$ to nth blocks (n is a divisor for the number of lines of line data included in the sector data) in the recording sequence of the main data, the correction capability of the generated digital signal can be improved up to n times in comparison with that of FIG. 2.

Next, the third embodiment of the digital signal forming method of the present invention will be explained with reference to FIG. 4.

Figure 4A:
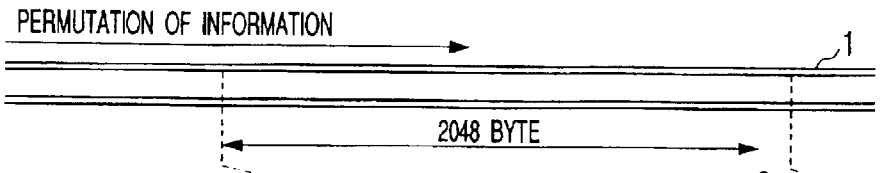
FIGS. 4(A) to 4(D) illustrate the allocation of data and code for explaining the second embodiment of the digital signal forming method of the present invention.
Figure 4B:
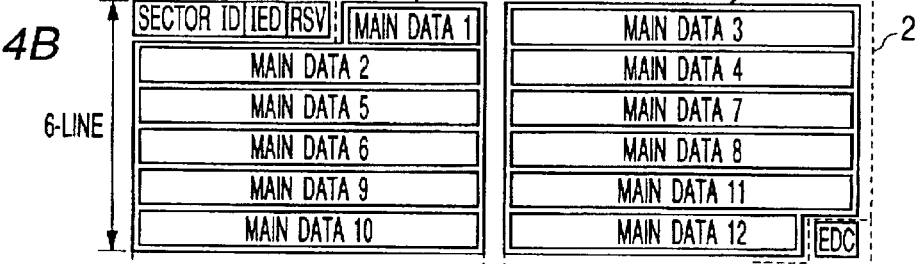
Figure 4C:
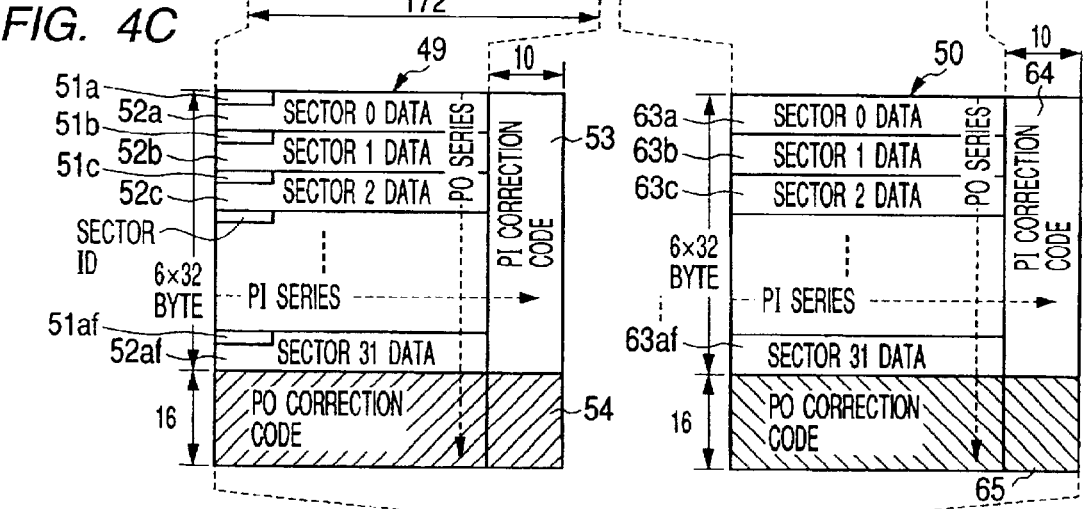
Figure 4D:
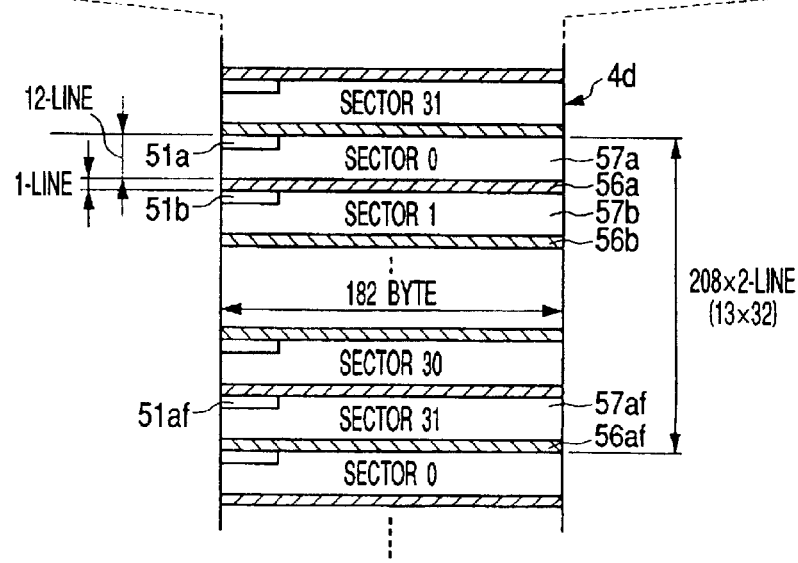

FIG. 4(A) illustrates a recording information on a recording disc; FIG. 4(B), a sector data; FIG. 4(C), a correction block; and FIG. 4(D), an interleave allocation.

As illustrated in FIG. 4(B), the sector data 2 is divided to a first and a second sector data block 2f, 2g. In the first sector data block 2f, the sector ID, IED, RSV and main data 1, 2, 5, 6, 9, 10 are allocated, while in the second sector data block 2g, the main data 3, 4, 7, 8, 11, 12 and EDC are allocated. The first correction block 49 is formed with addition of the PI correction code and PO correction code to the main data of the each first sector data block 2f, while the second correction block 50 is formed with addition of the PI correction code and PO correction code to main data and EDC of the each second sector data block 2g.

In the first correction block 49 illustrated in FIG. 4(C), 51a, 51b, 51c, . . . , 51z, 51aa, . . . , 51af designate the sector ID; 52a, 52b, 52c, . . . , 52z, 52aa, . . . , 52af, the data of the sector 0 to sector 31; and these sector data 52a, 52b, 52c, . . . , 52z, 52aa, . . . , 52af include IED, RSV and main data indicated in the first sector data block 2f of FIG. 4(B); 53, the PI correction code; 54, the PO correction code. Moreover, in the second correction block 50, 63a, 63b, 63c, . . . , 63z, 63aa, . . . , 63af are data of the sector 0 to data of sector 31, while the sector data of 63a, 63b, 63c, . . . , 63z, 63aa, . . . , 63af include the main data and EDC indicated in the second sector data block 2g of FIG. 4(B). 64, the PI correction code; 65, the PO correction code.

As explained above, in the third embodiment, the sector data in unit of the 172 bytes×2 lines are allocated to be interleaved to the first and second correction block 49, 50. Since the sector data is interleaved to the first and second correction blocks 49, 50, the 32 sector data (16 sectors×2) are required. Two correction blocks, each block is formed of 182 bytes×(6 lines×32sectors+16 lines), namely 182 bytes× 208 lines, are formed.

In regard to the interleave method of the line data including the PO correction codes 54, 65 after generation of the first and second correction blocks 49, 50, the sector data in unit of 182 bytes including the PI correction codes 53, 64 is allocated in the sequence of line data to the main data 1 to 12 like FIG. 1. Namely, the recording information 1 is allocated to maintain the continuity thereof. Moreover, the line data including the PO correction codes 54, 65 are alternately interleaved between the sector data. In the case of FIG. 4, the heading line of the line data including the PO correction code 54 is allocated, for example, between the data of sector 0 and the data of sector 1, while the heading line of the line data including the PO correction code 65 is allocated between the data of sector 1 and the data of sector 2. Hereinafter, the line data including the PO correction codes 54, 65 are sequentially and alternately interleaved from the first and second correction blocks 49, 50.

With formation of the format as explained above, the interleave allocation 4d of FIG. 4(D) can be obtained. In the interleave allocation 4d, 57a, 57b, 57c, . . . , 57z, 57aa, . . . , 57af designate the data of sector 0 to sector 31 and each sector data 57a, 57b, 57c, . . . , 57z, 57aa, . . . , 57af include IED, RSV, main data 1 to main data 12, ECD and PI correction codes 53, 64. 56a, 56b, 56c, . . . , 56z, 56aa, . . . , 56af are sequentially allocated as the first line of the PO correction code 54, first line of the PO correction code 65, second line of the PO correction code 54, second line of the PO correction code 65, . . . .

As explained above, in the third embodiment, the data amount same as the correction block and the correction code of FIG. 2 can be used in direct and the compatibility for processing the reproduced digital signal can be maintained in the higher level by alternately interleaving the continuous recording information 1 and the sector data including the sector ID to the first and second correction blocks 49, 50, then also interleaving to the line data in the 32 sector data (two times of 16 sectors) and by re-allocating the line data forming each sector data included in the first and second correction blocks 49, 50 in order to maintain the continuity of the recording information on the occasion of alternately interleaving the line data including the PO correction codes 54, 65. Since the burst error can be interleaved respectively to the first and second correction blocks 49, 50 when a burst error in which continuous error occurs in the interleave allocation, generation of the digital signal can be realized with improvement of the burst error correction capability without increase of the redundant data. The interleave unit of the line data included in the sector data is not limited to the unit of 172 bytes×2 lines and when the line data is interleaved to two correction blocks, a divisor for the 172 bytes×3 lines, 172 bytes×6 lines, namely for the calculation result of (Number of lines of the sector data)÷(Number of correction blocks) can be thought. In the case of this third embodiment, it is thought the data is interleaved in the line unit of the divisor of 12 lines÷2=6.

Effect of improvement in the correction capability by dispersion of burst error in the third embodiment explained above will then be explained. For example, the digital signal generated depending on the third embodiment is recorded in the recording density two times the density of the related art. In this case, if a scratch or dust for generating the burst error of 16 lines is generated in the disc having a certain recording density, the burst error occurs in the 32 lines which are two times of 16 lines. However, since the burst error of 32 lines is interleaved to the allocation of the first and second correction block 49, 50 and thereby the error correction capability of the generated digital signal can be improved.

The steps to provide the digital signal forming method corresponding to the second and third embodiments explained above will be explained below.

The digital signal forming method comprises a step to form a plurality of sector data adding the address information indicating the position on the recording medium to a plurality of lines of main data in every constant recording information amount for the series of recording information, a step to divide the main data into a plurality of sector data blocks and a step to form a plurality of correction blocks adding the first correction code for the error in the line direction and the second correction code for the error in the vertical direction to each of the divided sector data blocks.

Moreover, the digital signal forming method further comprises a step to allocate the main data forming each sector data interleaved in a plurality of correction blocks by giving continuity thereto and a step to sequentially allocate each line of the second correction code among a plurality of sector data.

On a recording medium, the digital signal generated by executing at least the modulation process to the digital signal generated through the process including the above step is recorded.

Moreover, the amount of data in each process in the first, second and third embodiments will be expressed with the following ordinary formula.

In the digital signal forming method, the first to the nth correction blocks of the (i+q) bytes×(j×k/n+P) lines can be formed by forming a plurality of sector data, dividing such sector data to (i bytes×n lines)×j lines (i, j, n are positive integers and n is a divisor of j) for the continuous k (k is a positive integer) of sector data, generating the first correction code of p bytes (p is a positive integer) to each code length of (j×k/n) bytes and then generating the second correction code of q bytes (q is a positive integer) to each code length of i bytes series including the first correction code. Moreover, the allocation of (i+q) bytes×(j×k+p ×n) lines maintaining continuity of the line data for the k sector data interleaved in at least the first to nth correction blocks is formed. In this invention, after forming the first to nth correction block of the (i+q) bytes×(j×k/n+p) lines on the occasion of forming the allocation of the (i+q) bytes×(j×k+ P×n) lines due to the k sector data interleaved to the at least first to nth correction blocks the line data including the address information is allocated in the interval of (j×k+p× n)/k lines from the heading line of its allocation and the address information is continuous. And the line data including the first correction code is allocated in the interval of (j×k+p×n)/k lines following the line data for sector data and the line data including the first correction code for the first to nth correction blocks are alternately allocated.

At the forming the first to nth correction blocks, it is also possible that the line data is allocated in the n lines with the line data of continuous r lines defined as a unit (r is a positive integer and a divisor of j) of line data in unit of the i bytes (i is a positive integer) which is included in the sector data and is the additional unit of the second correction code. This is covered with the third embodiment.

Moreover, in the above ordinary formula, n=2 corresponds to the first embodiment.

Thereafter, on the occasion of recording the information to a recording medium, at least the modulation process and addition of the synchronous signal are executed to the digital signal generated through the above processes and is recorded on the recording medium.

Moreover, on the occasion of recording the digital signal generated with the method of the first, second and third embodiments explained above to a recording medium, the recording marks or pits are recorded in the recording density of y times (y is a decimal number equal to or larger than 1($\geq$1)), or with the higher efficient modulation system or with combination of the higher efficient modulation system and reduction of the recording marks or pits.

In regard to the recording to the tracks existing on the recording medium, the recording marks or pits are continuously or non-continuously recorded in every constant amount of data along with the tracks.

Next, a method for reproducing from the disc with the digital signals generated by the first, second and third embodiments will be explained below.

The digital signal is reproduced with the demodulation process to the modulation system for the signal read out from the tracks on the disc. The interleave allocation can be reproduced by storing the reproduced digital signal to a buffer memory. Moreover, a interleaving method of sector data executed in the recording, format of correction block and the number of blocks and the interleave method to form the interleave allocation from a plurality of correction blocks are determined depending on determination of the kind of disc. From the determination result, error correction process due to the decoding of the PI, PO correction codes for a plurality of correction blocks are performed with the random access to the buffer memory for the interleave allocation stored. Moreover, after the error correction process, the recording information can be reproduced by outputting the data of the main data 1 to 12 continuously from the buffer memory.

In this case, at the storing of the reproduced digital signal on the buffer memory, it is also possible to reproduce the digital signal with reproducing a plurality of correction blocks on the buffer memory and then executing the PI, PO correction processes.

Moreover, when further improvement of correction capability for the error is required due to the maintaining of readability and employment of the high efficient modulation system in the first, second and third embodiments explained above, it is also possible to introduce the method wherein encoding of the correction code having the higher correction capability with the same number of the correction code and the same length of the vertical and lateral series in the correction block. And the number of correction codes is increased without increase of the length of the vertical and lateral series. In this case, amount of data of correction block will be changed but the digital signal having improved the burst error correction capability can be generated through combination with the method to interleave the data in a plurality of correction blocks as in the case of embodiments.

In addition, the method of interleave the sector data to a plurality of correction blocks is not limited only to the methods of the first, second and third embodiments, it is enough that the line data included in the sector data is interleaved to a plurality of correction blocks. Therefore, the allocation sequence of sector data and the allocation sequence of line data including the main data interleaved a plurality of correction blocks are not required to be persisted in the continuity of the recording information.

Moreover, the interleave allocation is also not required to be persisted in continuity of the recording information in the sector data. The line data including the sector ID is allocated regularly in order to detect the position on the disc in reproducing, but the other line data may be allocated freely within the sector data or within the range in a plurality of correction block.

In addition, the digital signal generated depending on the first, second and third embodiments is recorded to a disk in the higher recording density with reduction of the recording marks (pits) or highly efficient modulation system in which generation of redundant signal is suppressed or with combination of these reduction and modulation system.

As explained above, according to the present invention, generation of the digital signal having improved the correction capability for the burst error can be realized by interleaving the line data of the sector data to a plurality of correction blocks with generation of the correction code.

Moreover, since the same correction code and correction block allocation can be used and there is no increase in amount of redundant data, the compatibility of the digital signal process can be maintained in the higher level.

In addition, since the burst error can be interleaved efficiently to a plurality of correction blocks at the time of reproducing a disc by recording the digital signal generated with the method of the present invention to a disc in the higher recording density, readability in the disc reproducing can be attained easily.

What is claimed is:

1. A method for recording a digital signal on a recording medium, comprising:
    a step to form a plurality of data sectors, each comprising address information indicating its position on a recording medium and main data obtained from a stream of recording information,
    a step to divide the data sectors to produce a plurality of sector data blocks,
    a step to form a plurality of correction blocks, each comprising one of the sector data blocks, first correction codes for correcting a first kind of error, and second correction codes for correcting a second kind of error, and
    a step to combine at least two of the correction blocks to produce an interleave allocation, wherein a plurality of interleave allocations is formed by combining two or more of the correction blocks for each interleave allocation,
    wherein each line of data from among the second correction codes of the correction blocks is associated with one of the interleave allocations such that lines of second corrections codes of adjacent interleave allocations are from different correction blocks.

2. A method according to claim 1, wherein each sector data block is arranged as a plurality of lines of data, the method further comprising for each of the sector data blocks, a step to append portions of the first correction codes, to each of the lines of the sector data.

3. A method for recording a digital signal on a recording medium, comprising:

a step to form, for a series of recording information, a plurality of data sectors, each having address information indicating a position on a recording disc and an amount of main data obtained from the recording information, a step to divide each data sector to produce an odd sector data block and an even sector data block, thereby producing plural odd sector data blocks and plural even sector data blocks, wherein each odd sector data block comprises odd-numbered lines taken from its data sector, wherein the even sector data block comprises even-numbered lines taken from its data sector, wherein each odd-numbered sector data block contains the address information of its data sector, a step to form first correction blocks and second correction blocks by adding a first correction code and a second correction code respectively to each of the odd and even sector blocks to correct for first kinds of error and by adding a third correction code and a fourth correction code respectively to each of the odd and even sector blocks to correct for second kinds of error, and a step to produce a plurality of interleave allocations by combining the first correction blocks and the second correction blocks.

4. A method according to claim 3, wherein each sector data block is arranged as a plurality of lines of data, the method further comprising:

a step to append portions of the first correction codes to each of the lines of the sector data blocks, and a step to associate lines of data from the second and fourth correction codes with successive ones of the interleave allocations in alternating fashion.

5. A recording medium on which a digital signal is recorded through modulation, wherein said digital signal is formed by:

forming, for a series of recording information, a plurality of data sectors, each comprising address information indicating a position on the recording medium and main data obtained from the recording information, dividing the data sectors to produce a plurality of sector data blocks, each sector data block comprising a plurality of lines of data, for each sector data block, adding error correction codes thereto including adding first correction codes and second correction codes, the second correction codes being appended as additional lines of data in the sector data block, the first correction codes being appended to each line of data in the sector data block, the first correction codes to correct errors in the line direction of the data and the second correction codes to correct errors in the vertical direction of data in a sector data block, and producing a plurality of interleave allocations by combining lines of data from two or more sector data blocks and a line of data taken from one of the second correction codes of the two or more sector data blocks, such that adjacent interleave allocations comprise lines of data from the second correction codes of different sector data blocks.

6. A recording medium on which a digital signal is recorded, wherein said digital signal is formed by:

forming, for a series of recording information, a plurality of data sectors, each data sector being formed by adding address information indicating a position on a recording disc to an amount of main data obtained from the recording information, for each sector data, using its address information and its odd-numbered lines to produce a first sector data block, and using its even-numbered lines to produce a second sector data block, thereby producing a plurality of first and second sector data blocks, adding a first correction code and a second correction code, respectively, to each of the first and second sector data blocks to correct errors in the line direction of data, adding a third correction code and a fourth correction code, respectively, to each of the first and second sector data blocks to correct error in the vertical direction of data, and forming interleave allocations by combining the first and second sector data blocks and by associating the third and fourth correction codes with successive interleave allocations in alternating fashion.

7. A method to record a digital signal on a recording medium, comprising:

a step to form, for a series of recording information, a plurality of data sectors, each comprising address information indicating a position on the recording medium, a step to divide continuous ($k1 \times 2$) sector data to ($i$ bytes$\times 2$ rows)$\times j$ lines, a step to form the first and second correction code allocations of ($i+q$) bytes$\times$($j \times k1+k2$) lines that is formed, for respective two allocations of the $i$ bytes$\times$($j \times k1$) lines, by forming the first correction codes of $k2$ bytes to the code length ($j \times k1$) bytes series ($nk1=k2$, where $n$ is an integer) and then forming the second correction codes of $q$ bytes to the code length of $i$ bytes series including-said first correction code, and a step to execute thereafter at least the modulation process and the process to add the synchronous signal.

8. A method to record a digital signal according to claim 7, wherein said first and second correction code allocations of the ($i+q$) bytes$\times$($j \times k1+k2$) lines are formed and thereafter the allocation of ($i+q$) bytes$\times$(($j \times k1+k2$)$\times 2$) lines are formed maintaining the continuity of the line data for the ($k1 \times 2$) sector data interleaved at least to the first and second correction allocations.

9. A method to record a digital signal according to claim 8, wherein at least the line data including the address information is allocated with an interval of ($j+1$) lines from the heading line of said allocation and the allocated address information is given the continuity.

10. A method to record a digital signal according to claim 8, wherein at least the line data including said first correction code is allocated with an interval of ($j+1$) line following the line data for said sector data and the line data including said first correction code for said first and second correction code allocations is alternately allocated.

11. A method for reproducing a digital signal from a recording medium recording, wherein the digital signal is formed according to the method of claim 1, comprising:

a step to correct errors in the digital signal by generating reproduced correction blocks from the digital signal and decoding the first and second correction codes associated with the reproduced correction blocks, and a step to reproduce, after error correction, the stream of recording information.

12. A method of reproducing a digital signal from a recording medium recording, wherein the digital signal is formed according to the method of claim 1, the method comprising:

a step to recover a plurality of the correction blocks from a stream of data obtained from the recording medium, a step to correct errors occurring in the stream of data using first and second correction codes obtained from the plurality of correction blocks, and a step to reproduce, after correcting the errors, the stream of recorded information from the stream of data.

* * * * *